Sept. 28, 1971 — U. SCHNELLE — 3,608,209
EDUCATIONAL GAME
Filed Oct. 14, 1969 — 9 Sheets-Sheet 5

Inventor:
Udo Schnelle
BY Spencer & Kaye
ATTORNEYS.

Sept. 28, 1971  U. SCHNELLE  3,608,209
EDUCATIONAL GAME

Filed Oct. 14, 1969  9 Sheets-Sheet 4

Inventor:
Udo Schnelle
BY *Spencer & Kaye*
ATTORNEYS.

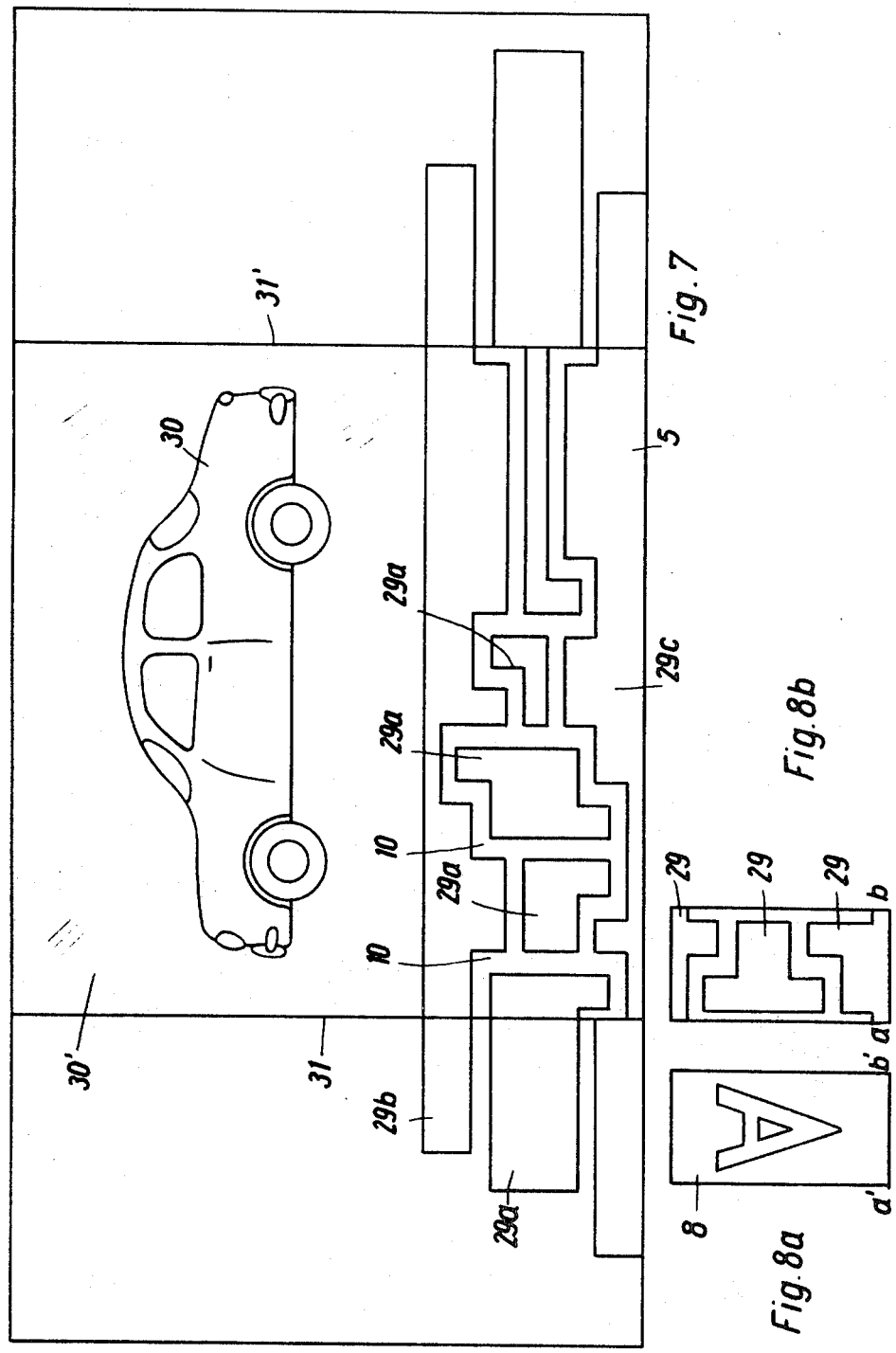

Sept. 28, 1971   U. SCHNELLE   3,608,209
EDUCATIONAL GAME
Filed Oct. 14, 1969   9 Sheets-Sheet 6
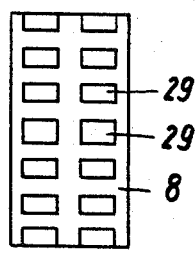
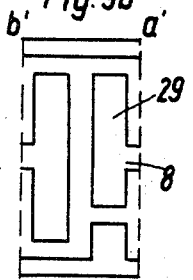
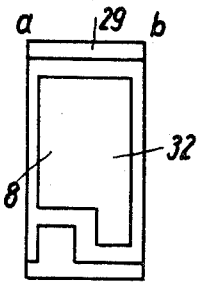
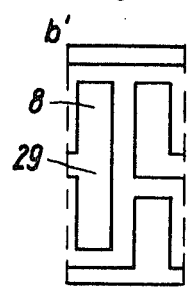
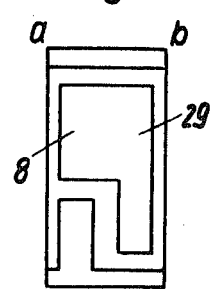
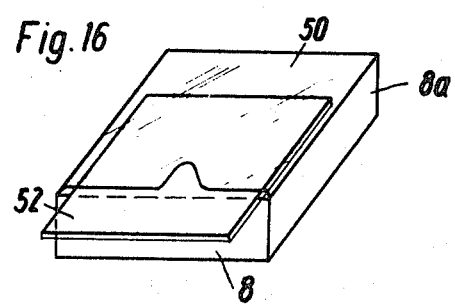
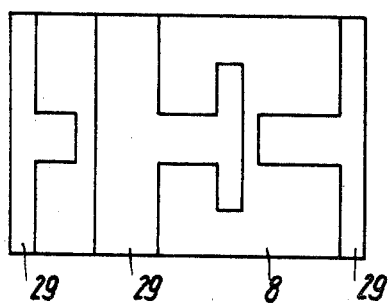
Inventor:
Udo Schnelle
BY Spencer & Kaye
ATTORNEYS.

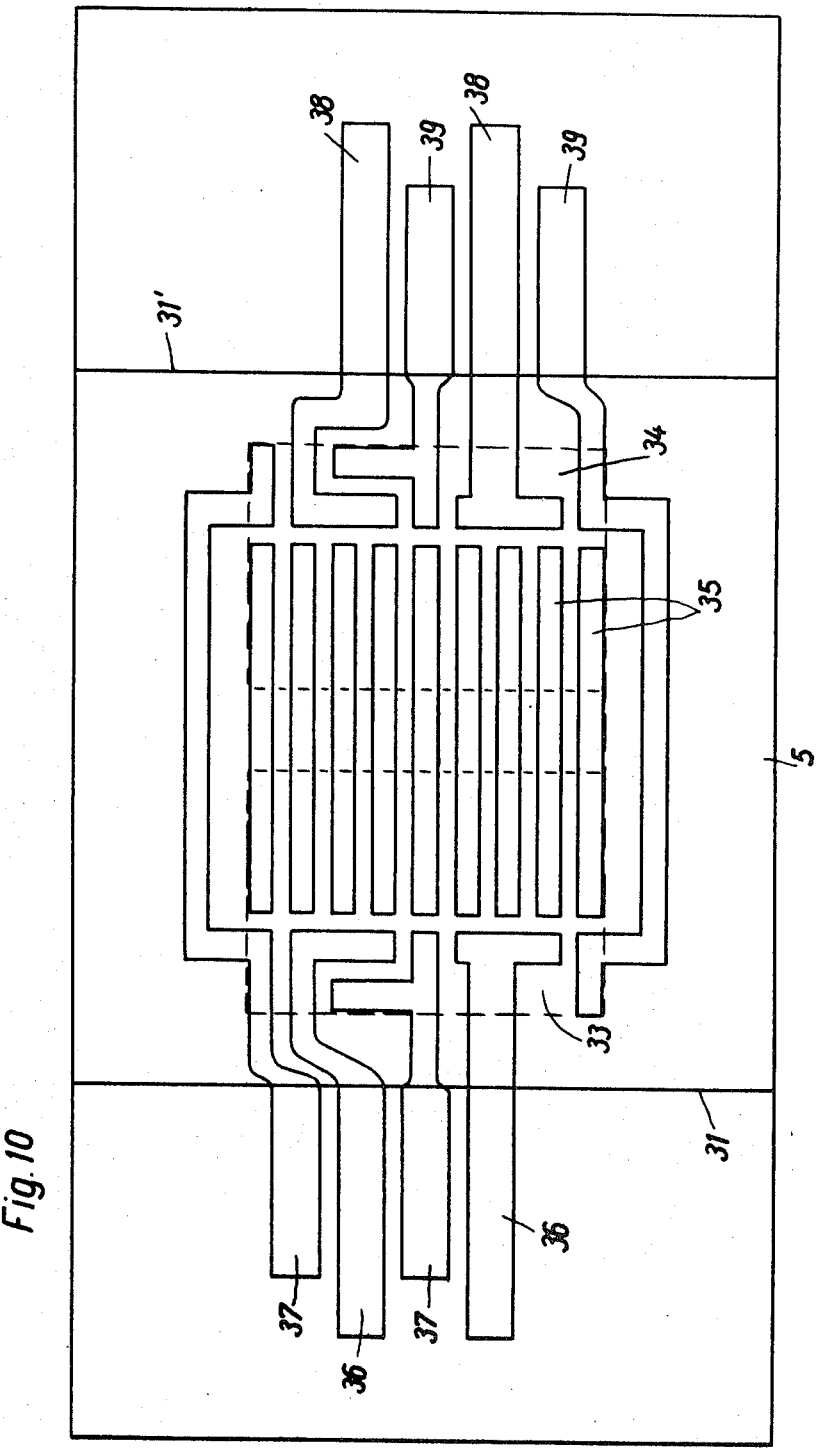

Sept. 28, 1971  U. SCHNELLE  3,608,209
EDUCATIONAL GAME

Filed Oct. 14, 1969  9 Sheets-Sheet 8

Inventor:
Udo Schnelle
BY Spencer & Kaye
ATTORNEYS.

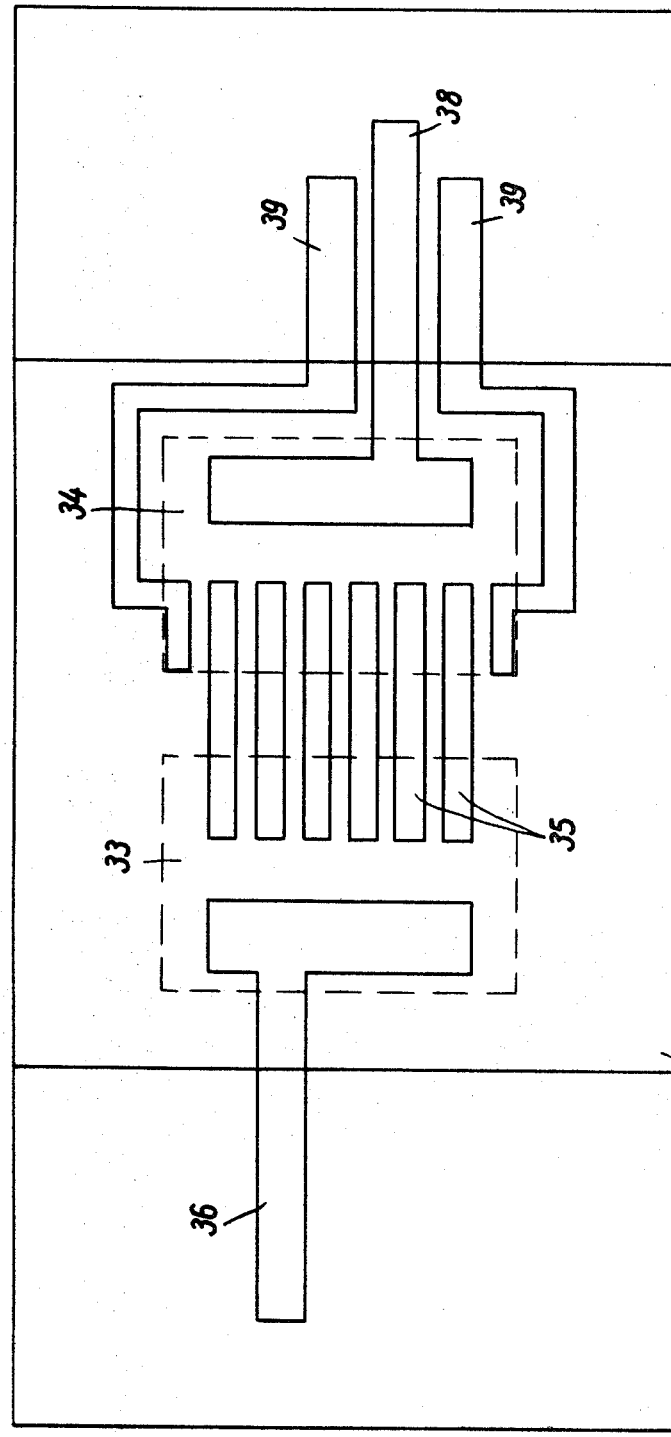

United States Patent Office 3,608,209
Patented Sept. 28, 1971

3,608,209
EDUCATIONAL GAME
Udo Schnelle, Frankfurt am Main, Germany, assignor to Franckh'sche Verlagshandlung W. Keller & Co., Stuttgart, Germany
Filed Oct. 14, 1969, Ser. No. 866,193
Claims priority, application Germany, Oct. 15, 1968, G 68 02 334
Int. Cl. G09b 7/00
U.S. Cl. 35—9D                                   35 Claims

ABSTRACT OF THE DISCLOSURE

An educational game composed of a plurality of teaching elements, preferably in the form of building blocks with symbols on one surface and conductors on the opposite surface, insertable into a defined area of a frame in a box containing a circuit card and a circuit board in electrical contact with each other. The circuit board is fixed in the box, but the circuit card can be replaced with a different one. Lamps are provided to indicate whether the blocks are properly arranged. A relay causes the circuit for the correct signal lamp to open if there is a current in the circuit for the error signal lamp. A relay can also be provided to open the correct signal lamp circuit unless the error signal lamp has been actuated at some time since the previous correct answer.

BACKGROUND OF THE INVENTION

The present invention relates to an educational game in which electrical circuits are closed to indicate whether a solution of a given problem is correct or incorrect. Such teaching instruments are particularly advantageous since they can be used to teach the student, who in the present case may be a child of an age of about 2 years old and up, to learn the solution to the given problem by way of a game. With such instruments it is not absolutely necessary that the child be supervised or guided when playing with the game.

German Patent No. 849,024 discloses an electrical educational toy which consists of an elongated board divided into two halves. Arithmetic problems are given in small boxes in the left half of the board. For each problem, which might be, for example, a simple multiplication problem, there is an associated contact jack. On the right half of the board there are answers to the problems, given in a different order, also in small boxes with an associated jack. The student must insert a banana plug into the jack associated with the problem he desires to solve. He must then locate in the right half of the board a solution to the problem and its associated "answer jack" into which he then plugs a second banana plug. If his solution is correct, a light lights up in the center of the board; its circuit having been closed by the two plugs.

This known instrument has various drawbacks, however. Namely, the problems and their solutions on the one hand and the means actuating the signal on the other hand, are separated, which is disadvantageous since such separation performs no teaching function. Moreover, the child will find that the solution to a certain problem and the problem itself always remain at the same place on the board so that after very little practice with this instrument he will remember into which jack he must insert his "answer plug." The child thus possibly remembers the location of the correct solution rather than the correct solution itself.

SUMMARY OF THE INVENTION

The present invention eliminates the drawbacks mentioned above. It is an object of the present invention to provide a teaching machine which has a multitude of possible variations with respect to the given problem as well as its solution. This permits the student to manipulate the individual problem or solution elements.

As is known, small children in particular learn especially easily when it is possible for them to directly manipulate the elements of a problem or its solution without having to go through the intermediary of a keyboard or the like.

This is accomplished according to the present invention, in that a plurality of teaching elements which are positionable relative to one another are used to set the problems and/or provide their solutions. These teaching elements, have conductive elements attached to them which, when the teaching elements are arranged incorrectly, or are misassociated, close the electrical circuit for the error signal and when the problem is correctly solved, close the electrical circuit for the correct signal.

These teaching elements thus consist of concrete, manipulatable objects which must be brought, in the course of solving the given problem, into a certain relationship either to one another or to the teaching element of the given problem. Such teaching elements may thus be building blocks, for example, with symbols attached to them. The symbols may be letters, arithmetic problems or pictorial representations of simple objects, such as an automobile, a house or a ball. These teaching elements, however, may also be constituted by three-dimensional elements known to the student from their nature, e.g. representations in which the solution to the problem consists of a certain arrangement of teaching elements, the correct arrangement of the elements being predetermined. For example, the teaching elements in this case may be represented by the individual bones of a skeleton which must then be assembled in their proper sequence. In this case, there will be no separate teaching elements for setting up the problem, since the problem is evident from the individual bones themselves.

These teaching elements are provided with conductive elements by means of which an electrical circuit for an error signal and/or a correct signal can be closed. Generally, the conductive elements will be so designed that a voltage will be applied to the error signal circuit whenever one of the teaching elements is incorrectly inserted by the student. In a similar manner, the conductive elements will generally be so arranged that the electrical circuit for the correct signal will be closed whenever the given problem is solved correctly. These two principles, however, need not always be strictly adhered to. It may be preferable, for example, to reward very small children with a correct signal while preventing the error signal from being actuated by an incorrect arrangement.

Also, the correct signal, or reward, can be partially omitted so that the child's attention is directed away from the reward toward the solution to the problem. The child should not attempt to solve the problem for the sake of a reward which is known as secondary motivation, but rather for the sake of the correct solution itself. The latter is known as primary motivation. The more satisfied a child is with the learning process per se, the more successfully he learns. This is accomplished by having the reward, which at first occurred quite regularly, withheld from him, or arbitrarily given. Thus the reward loses its significance as a learning incentive.

According to a preferred embodiment of the present invention, the teaching elements are building blocks which are provided on their top surface with a symbol and on their underside with electrical conductive elements in the form of sheets or layers of conductive material. The student can thus easily manipulate the elements and can place their underside onto elements of the circuits to be closed. The symbols may be irregularly shaped figures which, when a variety of building blocks provided with such symbols are placed together, result in an imaginative pattern, or an arithmetic problem. Letters or pictures of simple or complicated objects may be represented by these symbols.

In particular, the building blocks can be easily arranged either in groups or individually, to form a pattern outline when these blocks have a rectangular configuration.

When the configuration of the building blocks is irregular, the student can learn, for example, their correct arrangement as a function of their position in an appropriate pattern outline. The recognition of such shapes is particularly important for smaller children.

The teaching machine according to the present invention offers a particularly large number of possible variations when the conductors of the teaching elements are placed on a circuit card to which a voltage is applied. This circuit card may easily be replaced by another card so that different types of associations or arrangements of the teaching elements are possible without otherwise having to modify the apparatus.

In order to bring the electrical voltage to the circuit card in as simple a manner as possible and, thus, further increase the number of possible variations, a further preferred embodiment of the present invention provides that the circuit card rest on a printed circuit board. This printed circuit board provides the electrical contact between the voltage source and the circuit card.

In order to make the electrical contact between the conductors of the teaching elements, the circuit card and the printed circuit board as safe and dependable as possible, the circuit board may be magnetic and the teaching elements may be provided with soft-iron parts. The printed circuit board and the teaching elements thus attract one another and provide a relatively efficient electrical contact. Moreover, the teaching elements thus adhere well to the printed circuit board, which increases the ease of handling of the apparatus.

A particularly simple embodiment results when the building blocks used as teaching elements are provided at their underside with a soft-iron plate which is insulated from the conductive elements.

In order to construct a teaching machine according to the present invention as compactly as possible and also to provide it with a defined area, or field into which the teaching elements can be placed, the circuit board may have a rectangular shape and may be enclosed in a frame which forms part of a box containing the voltage source and signal lights.

It has proven to be particularly advantageous to have the correct signal in the form of a green signal and the error signal in the form of a red signal. In the above-mentioned box, these signals may be provided by electric lamps with an appropriately colored filter covering them.

To further increase the possible number of variations, the circuit board may preferably be divided into a plurality of electrically insulated conduction fields. These conduction fields are connected with the input lead for the voltage source, or with one or a plurality of the output leads for the error and correct signal circuits. A particularly favorable division of the circuit board results when it is divided into four conduction fields, of which one is connected with the voltage source input lead, one with the output lead for the correct signal and two with the output leads for the error signal.

In order to be able to use the same circuit board for as many circuit cards as possible, it may be advantageous to have the fields which are connected with the voltage source input lead and the output leads for the error signal extend substantially from two abutting sides of the frame inwardly into the field somewhat in the shape of a comb. The opposing fields will then be approximately symmetrical with respect to the appropriate center line of the frame. The circuit card may be provided with a plurality of electrically insulated conductive foil portions, of which some are connected, through the circuit board, with the input lead or with the output lead or leads. In this embodiment the conductive members of the teaching elements bridge the insulating pieces and thus produce an electrical contact between the poles of the voltage source which, depending on the solution of the problem, leads to the error signal or to the correct signal.

Depending on the type of problem to be solved, there are various advantageous forms of construction for the circuit cards. One of these circuit cards can be so constructed that one conductive foil portion is connected with the output line for the correct signal, the other conductive foil portions filling the entire frame in a meandering pattern, interrupted by insulated sections. When this circuit card is used, it is possible to advantageously solve a problem which is particularly suited for small children, i.e., fill a given field—in this instance the frame of the box—with blocks having a rectangular configuration as teaching elements, where the entire underside of these blocks is electrically conductive. In this case, the child must fill the entire area outlined by the frame, which also corresponds to the area of the circuit card, with such blocks before the correct signal appears as a reward. The conductive undersides of the blocks here bridge the insulating sections of the meandering pattern and close the circuit for the correct signal. An error signal does not appear in this instance.

Another embodiment of the present invention suitable for small children, even toddlers, has the conductive portions interrupted only by one insulated section. It is preferred for this purpose to provide four identical insulating plates which can be inserted into the frame. These plates leave open an irregularly shaped outline in the center of the circuit card into which an appropriately outlined block fits. The entire underside of this block is conductive. The child must introduce this block into the outline given by the insulating plates in a certain orientation. Since the child generally must choose from among a plurality of unidentical blocks he is thus trained to distinguish shapes. In this embodiment the conductive underside of the block also bridges the insulated section of the circuit card so that the correct signal will appear as a reward.

In another embodiment of the circuit card, a given object may be represented by letters. In addition, entire words or parts of speech may take the place of individual letters. In this case, the circuit card consists substantially of a band of approximately constant width which takes up part of the frame. The rest of the frame may be taken up by an insulating foil of which the problem to be solved, e.g. a picture of an automobile, is shown. In this embodiment of the circuit card, a conductive foil portion is connected to the input lead, and a further portion is connected to the output lead for the correct, or green signal. Further insulated foil portions for the green signal circuit extend between these two conductive foil portions. The band is also bordered at the top and/or bottom by at least one insulated error, or red signal, conductive foil portion which is conductively connected with the output lead for the error signal.

The blocks that go with this circuit card have a rectangular configuration and are provided with symbols. Their conductive elements are so arranged that when they are correctly arranged they bridge the insulated sections between the input lead and the output lead for the correct signal without producing a contact with the conductive foil portion for the red signal. When the arrangement is incorrect, however, the conductive elements bridge the insulation between the red signal conductive foil portion and one of the green signal conductive foil portions. If, for example, the word "auto" is to be correctly reproduced by its individual letters, a block representing the letter "A" must be placed in the lower left corner of the frame. The block representing the letter "A" then bridges with its conductive elements a first insulated section between the green signal line of the conductive foils. These conductive elements for the block representing the letter "A" are so arranged that a bridge is produced between the correct, or green, signal line, and a bridge between one of the error, or red, signal lines should the block representing the letter have been inserted upside down. The same applies when a block representing a wrong letter is inserted in the first position.

By bridging the green signal line and the red signal line, the red signal is supplied with current and lights up. It generally suffices to have the green signal line bordered by two continuous red signal lines. This provides a sufficient number of possible variations, for example, for all the letters of the alphabet. One should here imagine one face of the rectangular letter blocks to be covered by two parallel rows of seven contact elements each. The two center contact elements are associated with the green signal line for all of the variations, whereas the four outer contact elements always remain associated with the upper and lower red signal lines; the upper elements with the upper lines, and the lower elements with the lower lines. Two rows with four contact elements each always remain "free." Two of these rows extend to the right and two to the left of the center contact elements. The variations are produced by connecting each of these eight "free" contact elements once with the green signal line and once with each of the red signal lines. This results in more than 100 possible combinations.

To decrease the size of the frame used with the last-described embodiment of the circuit card, a transparent plate which covers the insulating foil with the symbol of the problem may be employed.

A fourth preferred embodiment of the circuit card also has a question field and an answer field, the question field being provided with two current input leads and three output leads for the error signal, and the answer field being provided with three output leads for the error signal and two output leads for the "correct" signal. The above-mentioned leads take up only a portion of the field which is adjacent to the edge of the frame and the remaining portions of the fields are connected with parallel insulated conductive foil, or elements.

In this embodiment a teaching element is generally inserted into either the question or the answer field, which element is a symbol of the problem to be solved. This may be the picture of a bird, for example. The problem is solved correctly when the child inserts a teaching element into the remaining field which bears the legend "Bird." It is also conceivable that the question field be associated with any other kind of conceivable problem to which an unambiguous solution can be associated; for example, a mathematical problem, which must then be solved in the answer field.

Corresponding entirely to the previously described embodiments of the circuit cards, the proper solution will cause the "correct" signal circuit to be closed by the conductive members of the teaching elements, whereas the incorrect solution will produce a "short-circuit" between the green signal line and one of the red signal lines. For this purpose, 9 parallel conductive foil member portions are generally sufficient.

If in this case, buiding blocks are used as the teaching elements, with which a distinction between "up" and "down," or "top" and "bottom" must be made, as for example, with the picture and word "Bird," the conductive elements of these blocks may be constructed to be asymmetrical with respect to the axis of symmetry which is parallel to the parallel conductive foil member portions. This will result in an error signal appearing as soon as the respective teaching element is inserted in the wrong position. In this case, two conductive members of the respective block, which members extend from its sides perpendicularly to the parallel conductive foil lines to different distances into the interior of the field, connect a different number of these different conductive foil portions so that a "short-circuit" is produced when the block is reversed. The visible field of the circuit card may be constructed to be symmetrical with the axis of symmetry which is perpendicular to the parallel conductive foil members.

A plate, which may be transparent, with two cut-out areas may also be provided in this embodiment of the circuit card. This plate covers the circuit card except for the cut-out areas, and provides an outline for the teaching elements.

As mentioned above, the error signal is to be predominant over the "correct" signal, i.e. the "correct" signal must not appear when the electrical circuit for the error signal is closed. This applies if there should be a connection for the "correct" signal. For this puropse, a preferred embodiment provides a relay in the electrical circuit of the error signal which opens the circuit for the "correct" signal as soon as a voltage is applied to the relay. The "correct" signal can thus only light up when there is no current flow through the error signal circuit.

It has already been mentioned above that there is an educational advantage if the correct signal does not appear every time a problem has been solved correctly. For this purpose there is provided a relay through which the current for the error signal flows and which is provided with two stable armature positions. In its one position, the relay closes the circuit for the "correct" signal and in the other position it interrupts it.

The circuit card, with its question and answer fields, can also be so constructed that a current input lead leads into the question field and an output lead for the "correct" signal as well as two output leads for the error signal lead to the answer field. The question field is connected with the answer field by a plurality of conductive foil portions. This results in a particularly simple embodiment of the circuit card, and the associated blocks may be so designed that lighting up of the appropriate signal serves also to distinguish between "up" and "down."

When the current input lead and the output lead for the "correct" signal end in conductive portions in the question or answer field, respectively, which are opposite the conductive foil portions, the associated blocks may be provided with conductive strips in such a manner that a certain block always connects a conductive portion in either the question field or the answer field with a certain conductive foil portion. In this case, the "correct" signal circuit will only be closed in the answer field when the selected conductive foil portion is connected by the conductive strip of the answer block with the output line for the "correct" signal. When the answer is incorrect, another conductive strip of the block connects this current-conductive foil portion with one of the output leads for the error signal.

For this purpose, the associated building blocks are designed in an advantageous manner so that they are provided with conductive strips which in the question field connect the current input lead with only one of the conductive foil portions. In the answer field they connect the same conductive foil portion with the output for the "correct" signal when the blocks are arranged correctly and with the output lead for the error signal when the blocks are arranged incorrectly.

It should also be mentioned that the instrument according to the present invention is suited for pleasure as well as for teaching.

BRIEF DESCRIPTION OF THE DRAWINGS

FIG. 4a is a perspective view of a building block for use with the circuit card according to FIG. 3.

FIG. 4b is a perspective view of the bottom of the element of FIG. 4a.

FIG. 7 is a plan view of a circuit card in the form of a band with a symbol above it representing the given problem.

FIGS. 8a and 8b are a front view and a rear view, respectively, of a building block which solves the first part of the problem given in FIG. 7.

FIGS. 9a–9e are further rear views of building blocks which are used together with the circuit card of FIG. 7.

FIG. 10 is a plan view of yet another embodiment of a circuit card according to the invention.

FIG. 11 is a rear view of a building block for use with the circuit card according to FIG. 10.

FIG. 14 is a plan view of yet another embodiment of a circuit card according to the invention.

FIGS. 15a and 15b are rear views of building blocks for use with the circuit card according to FIG. 14.

FIG. 16 is a perspective view of another building block for use with the circuit card according to FIG. 3. This building block has a transparent cover so that different charts with symbols can be inserted.

DESCRIPTION OF THE PREFERRED EMBODIMENTS

Figure 1:
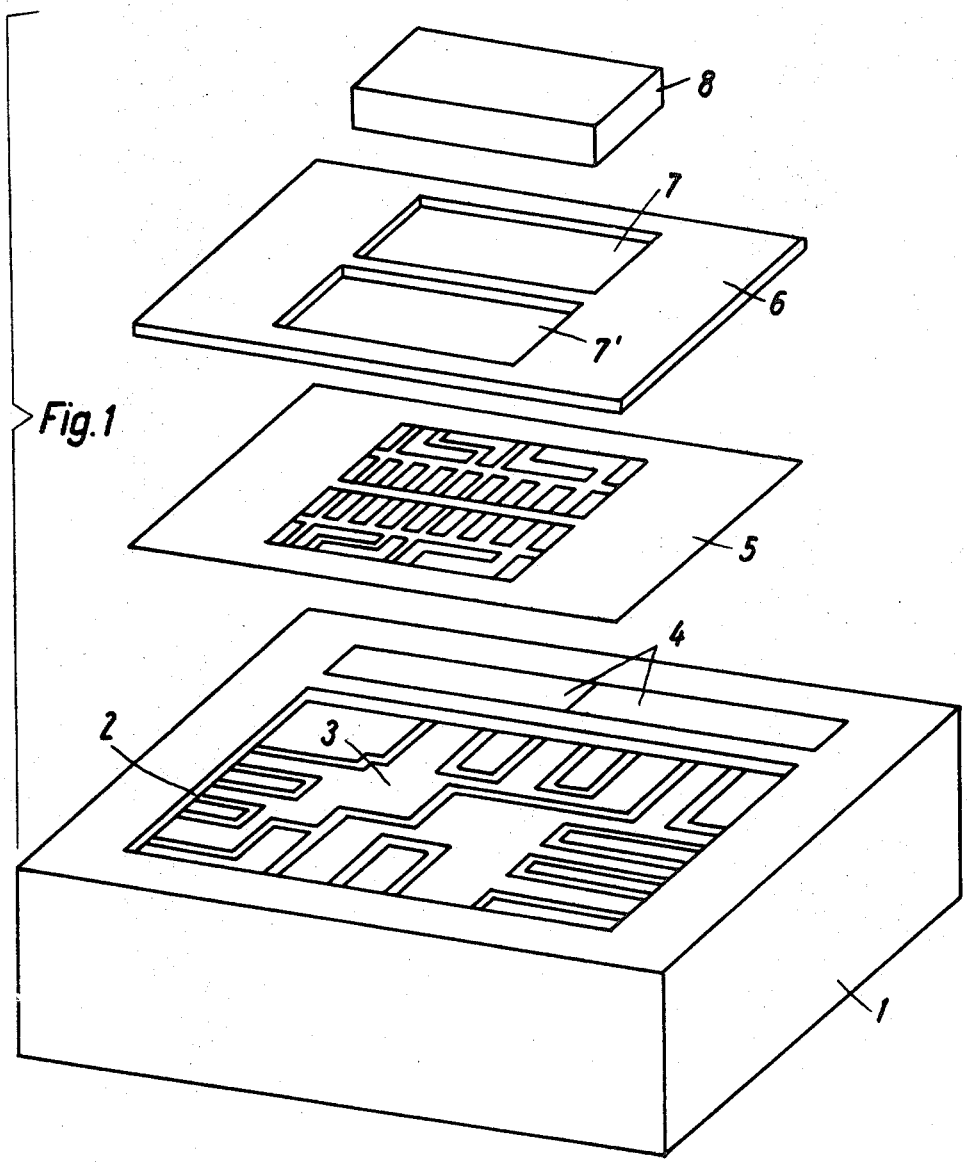
FIG. 1 is an exploded view of a device according to the present invention.

FIG. 1 shows an exploded view of a preferred arrangement of a device according to the present invention. It consists of a box 1 of conventional construction having a cut-out portion forming a frame 2 which defines the teaching field. A printed circuit board 3 is mounted in the frame 2 of the box 1. The box 1 also contains two ledges 4 behind which a red signal lamp 21 and a green signal lamp 18 are disposed, these lamps being shown schematically in FIG. 2. The lamps 18 and 21 may be regular electric lamps with an appropriately colored filter covering them. Circuit card 5 is inserted into the frame so that it is in contact with the circuit board 3. This circuit card 5 is covered by a cover piece 6, which has two windows 7, 7' for the question and answer fields respectively. The teaching elements 8, which in this embodiment are building blocks, are inserted into the windows 7.

Figure 2:
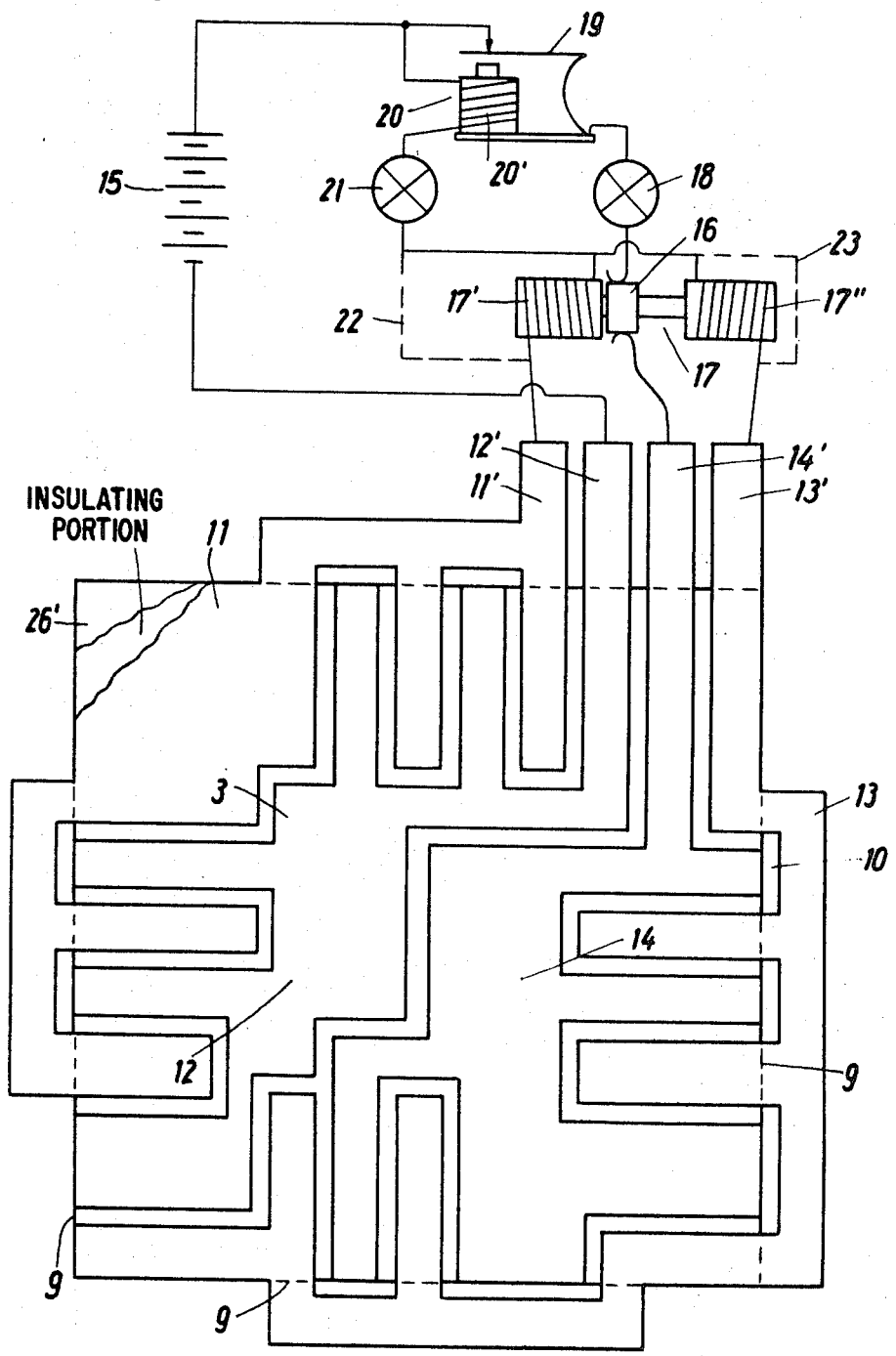
FIG. 2 is a partially schematic, partly broken away plan view of one embodiment of an element of the arrangement of FIG. 1.

FIG. 2 shows the circuit board 3 along with the associated circuitry for the signal lamps 18 and 21. As can be seen from FIG. 2, portions of the circuit board 3 are folded downwardly along the dotted lines 9 so that the circuit board 3 can be mounted in the box 1. The circuit board 3 is constructed from a suitable material and is divided into four electrically conducting fields 11, 12, 13 and 14. These four fields 11 to 14 are electrically insulated from each other by insulating strips 10 and are each made from a conducting foil, for example, aluminum foil, attached to the board by a suitable adhesive. Field 12 is connected to one side of a D.C. voltage source 15 by means of connecting section 12', whereas field 14 is connected to the other side of the voltage source 15 by means of connecting section 14', the armature 16 of a relay 17, the correct, or green, signal lamp 18 and the spring arm 19 of a switching relay 20. The error, or red, signal lamp 21 is connected to the other side of the D.C. voltage source 15 via the coil 20' of the switching relay 20. Relay 20 opens the circuit for the correct signal lamp 18 as soon as a voltage is applied to the coil 20' of relay 20. The correct signal lamp 18 can, thus, only light up when there is no current flow through the error signal lamp circuit. The error lamp 21 is also connected to fields 11 and 13 by means of the parallel-connected coils 17', 17" of the relay 17, each coil being connected to one of the fields 11 and 13. As shown in FIG. 2, the coil 17' is connected to the field 11 by means of connecting section 11', and the coil 17" is connected to the field 13 by means of a connecting section 13'. Depending on which one of the two coils 17', 17" has been previously excited by an error signal, the armature 16 of the relay 17 is either in the position for which the circuit for the correct signal is closed—in this case the correct signal lamp 18 lights up if the problem has been solved correctly; or the armature is in the other position in which the circuit of the correct signal lamp 18 is interrupted. In the latter case, the correct signal lamp 18 is not actuated, even if the student solved the problem correctly. The armature 16 can only be returned to the position in which it permits the circuit for the correct signal lamp 18 to close by actuating the error signal. Means are also provided to short-circuit either one or both of the coils of the relay 17 so that the coils of the relay 17 can be deactivated. The connection 22 can short-circuit the coil 17' and the connection 23 can short-circuit the coil 17".

Figure 3:
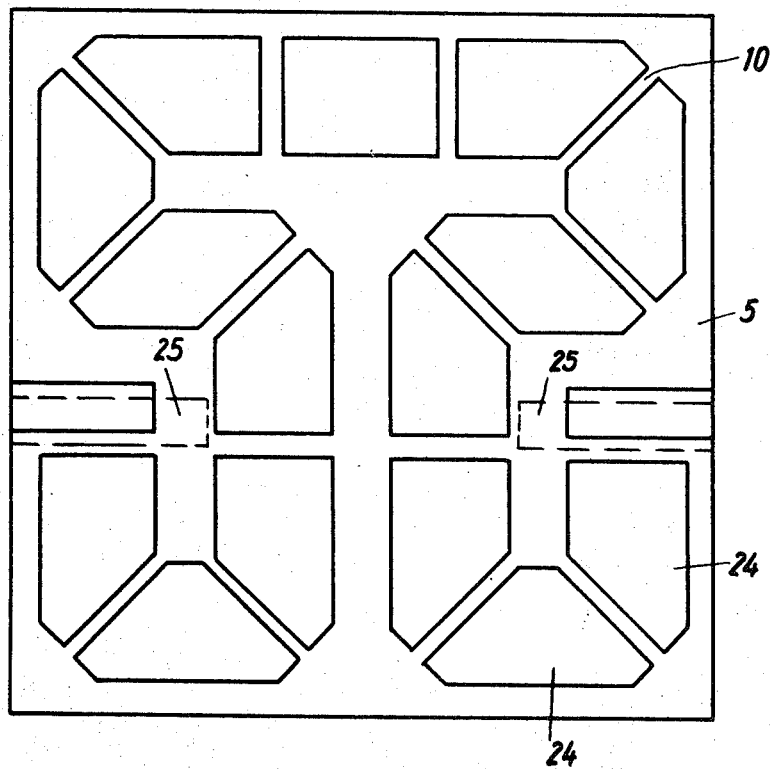
FIG. 3 is a plan view of a circuit card according to the present invention.

FIG. 3 shows a second embodiment of a circuit card 5 that can be used with the arrangement of FIG. 1. As can be seen in FIG. 3, the circuit card 5 has electrically conductive foil elements 24 laid out in a meandering pattern. Connecting strips 25 are connected to the rear of the circuit card 5 and are in electric communication with elements 24 so that an electrical contact between the respective conductive strips of the circuit board 3 and the circuit card 5 is realized.

Figures 4A, 4B:
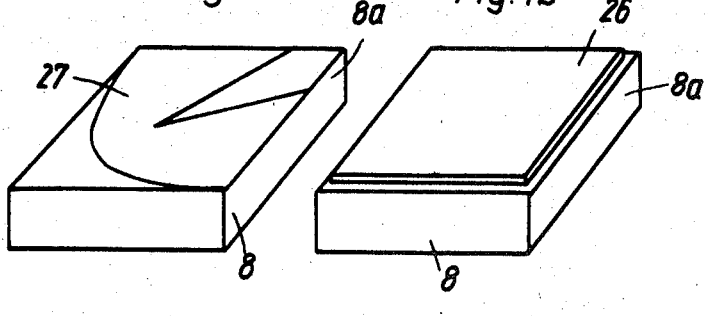

FIGS. 4a and 4b show building blocks 8 that can be used with the circuit card 5 of FIG. 3. These building blocks 8 consist of a wooden body 8a which has an iron sheet 26 attached to its underside. If it is not desired to have the whole underside of the building blocks 8 electrically conductive as it is the case with the sheets of FIG. 4b, there can be placed an insulating sheet between each iron sheet 26 and another sheet with partially conductive strips, as shown e.g. in FIGS. 6, 8b, 13a, 13b, 13c.

This iron sheet is attracted by a magnetic plate 26' which is disposed beneath the circuit board 3 (see FIG. 2). The upper surface of the blocks 8 can be covered with arbitrary and imaginative shapes 27.

Figure 5:
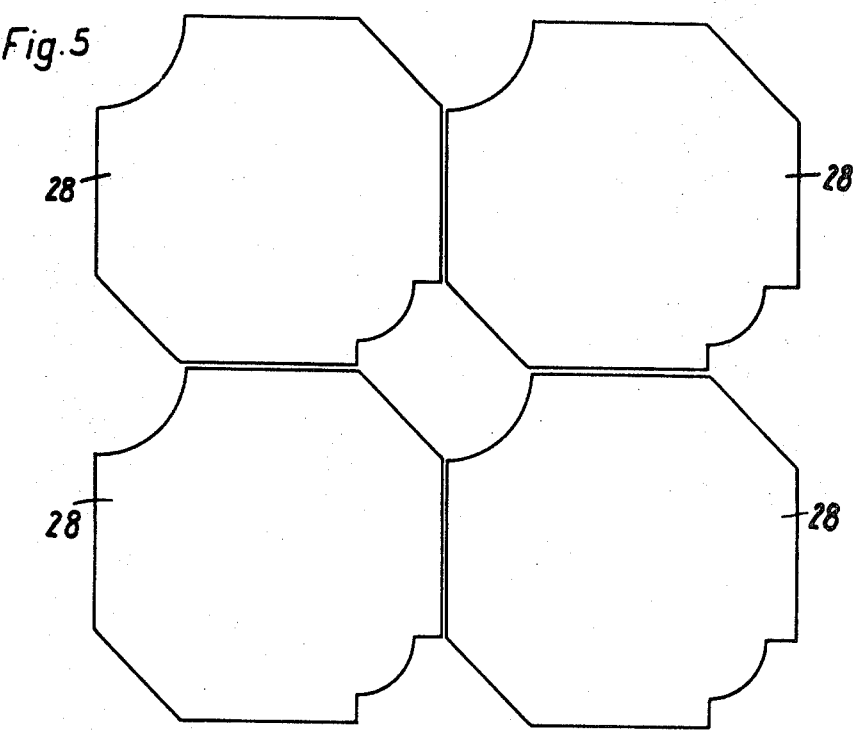
FIG. 5 is a plan view of four covers with irregular outlines which can be used with the device of FIG. 1 to provide an irregularly outlined insertion field.

FIG. 5 shows four identical cover plates 28 which have irregular or non-linear, outlines. These plates are designed to fit into the frame 2 in the place of the cover plate 6 of FIG. 1. An appropriately shaped block can be inserted into the irregularly shaped space left in the center of the four cover plates 28.

Figure 6:
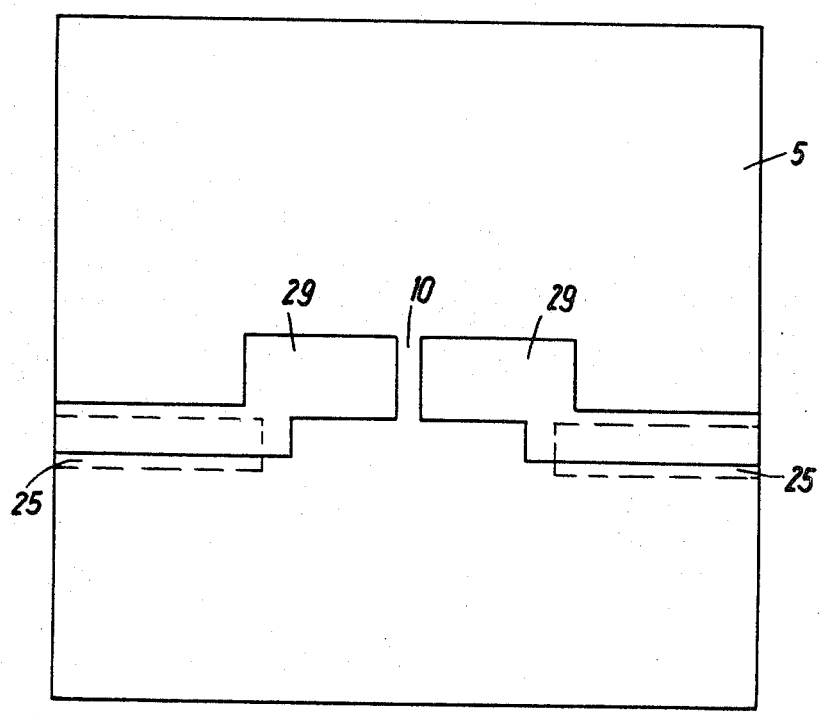
FIG. 6 is plan view of a circuit card for use with the covers according to FIG. 5.

FIG. 6 shows a circuit card 5 which can be used with the cover plates 28 of FIG. 5. It is provided with only two conductive strips 29, which will be bridged by a properly arranged block inserted into the center space formed by the cover plates 28. The conductive strips 25 serve a similar purpose to the conductive strips 25 of FIG. 3.

FIG. 7 shows another embodiment of the circuit card 5 which has three band-shaped conductive strips across its lower half. The non-continuous center strip 29a is in contact with the connecting section 11' of the field 11 of circuit board 3 (see FIG. 2). When the insulating strips 10 of the circuit board 3 are bridged, the right end end of this conductive strip 29a is connected with the connecting section 14' of field 14 of circuit board 3. Upper conductive strip 29b and lower conductive strip 29c are connected with the error signal lamp via the connecting section 11' of field 11.

FIG. 7 also shows an example of a symbol 30 provided as a problem to be solved. In this case, it is a picture of an automobile. The symbol 30 may be covered with a transparent cover plate 30'. The word "auto" is formed by placing the appropriate blocks onto the conduction band of circuit card 5. The first block will be abutting line 31, which represents the left edge of the frame 2. Line 31' represents the right edge of frame 2.

FIGS. 8a and 8b show an example of a block bearing the symbol "A." FIG. 8b shows the arrangement of the conductive strips 29 on the underside of the block of FIG. 8a.

FIG. 9a shows the division of the underside of a block 8 that is intended to be used with the circuit card 5 of FIG. 7. The underside of this block 8 is divided into 14 conductive elements 29. The two center contact elements are associated with the conductive element 29a for all of the variations, whereas the four outer contact elements always remain associated with the upper and lower conductive elements 29c. The upper elements are associated with the upper element 29c and the lower elements are associated with the lower element 29c. Two rows with four contact elements each remain "free." Two of these rows extend to the right and two to the left of the center contact elements. The variations are produced by connecting each of these eight "free" contact elements once with the green line and once with each of the red lines. This results in more than 100 possible combinations. FIGS. 9b to 9e show further possibilities for arranging the conductive strips 29 on the undersides of blocks 8. In FIG. 9c, for example, an element 32 bridges one of the insulating strips 10 that lines between the conductive strips 29a of FIG. 7.

FIG. 10 shows an embodiment of a circuit card 5 having a question field 33 and an answer field 34. FIGS. 11 and 13a–c show the arrangement of conductive strips 29 on the underside of blocks 8 which are intended to be used with the circuit card 5 of FIG. 10. The conductive strips 29 on the underside of the block 8 according to FIG. 11 is asymmetrical with respect to the center line of its longer dimension. This causes the error signal to be excited when the block is inserted the wrong way around into one of the fields 33 or 34. The conductive elements of the blocks 8 of FIGS. 13a through 13c, on the other hand, are symmetrically constructed. The latter arrangement is important because it enables the blocks 8 to bear symbols on their top surface which require no particular orientation. Examples of these types of symbols are a ball or a circle.

The circuit card 5 of FIG. 10 also includes parallel, longitudinally extending conductive foil elements 35. The foil elements 35 connect the fields 33 and 34 with each other. Connecting sections 36 make electrical contact with field 12 (see FIG. 2), connecting sections 37 make contact with field 11, connecting sections 38 make electrical contact with field 14 and connecting sections 39 make electrical contact with field 13. The lines 31 and 31' of the circuit card 5 shown in FIG. 10 also indicate the edges of the frame 2.

Figure 12:
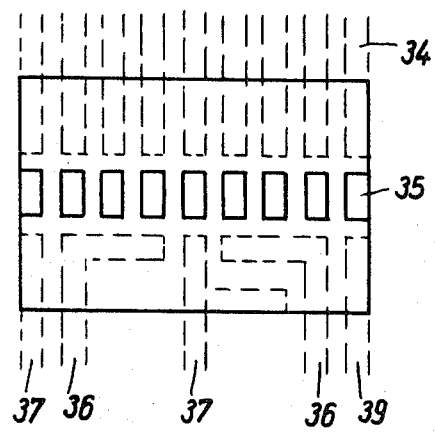
FIG. 12 is a partial view of the circuit card of FIG. 10.
Figure 13A:
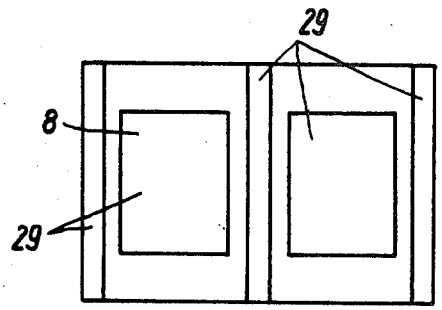
FIGS. 13a–13c are rear views of building blocks for use with the circuit card according to FIG. 10.
Figure 13B:
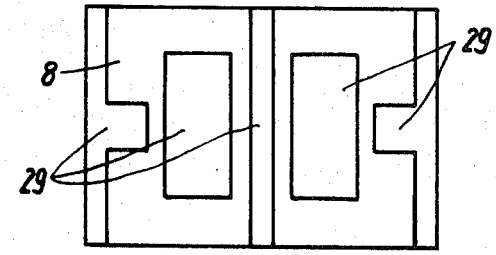
Figure 13C:
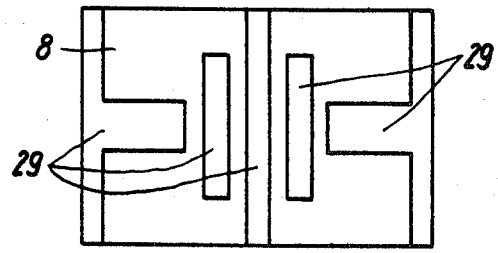

FIG. 12 is a schematic showing of the embodiment of a circuit card 5 as shown in FIG. 10. The result of this embodiment is that the connecting sections 36 are in contact with the circuit for the correct, or green, signal and the connecting sections 37 are in contact with the circuit for the error, or red signal. Connecting section 39 is also in contact with the circuit for the red signal.

FIG. 14 shows a circuit card 5 which is a simplified version of the embodiment of FIG. 10. This circuit card is provided with a connecting element 36 which ends with a widened conductive portion in the question field 33. Six parallel, longitudinally extending conductive foil strips 35 are arranged so that they go from the question field 33 to the answer field 34. The output connecting element 38 is arranged so as to be in contact with the circuit for the correct signal lamp 18 and ends with a widened conductive portion of the answer field 34. Both of the conducting elements 36 and 38 are insulated from the conductive foil strips 35. The conductive foil strips 35 are bracketed by two additional output connecting elements 39 which are in contact with the circuit for the error signal lamp 21.

FIGS. 15a and 15b show arrangements of the conductive strips on the underside of blocks 8 which are intended to be used with the circuit card 5 of FIG. 14.

It can be readily seen from the drawings that if the block 8 of FIG. 15a is inverted and rotated clockwise 90° and then inserted into the question field 33 of the circuit card 5 of FIG. 14, that a path will be completed between the connection element 36 and one of the conductive foil strips 35. In particular, the path will be completed through the conductive foil strip 35 that is second from the bottom. Similarly if the block 8 of FIG. 15b is inverted and rotated counterclockwise and then inserted into the answer field 34 of the circuit card 5 of FIG. 14, a path will have been established between the same conductive foil strip 35 as previously and the output connecting element 38. In this manner, a path has been established between the input connecting element 36 and the output connecting element 38. Since these two elements are in contact with the circuit for the correct signal lamp, the correct signal lamp will light up.

When the problem given for solution is solved incorrectly, for example, when the block 8 of FIG. 15b is disposed in the answer field 34 in an improper orientation, the conductive strip 29 connects the second conductive foil strip 35 from the top with the output connecting element 38. This conductive foil element 35, however, does not have a voltage applied to it, so that the correct signal lamp circuit remains unexcited. In this case, one of the conductive strips 42 of the block 8 of FIG. 15b connects the conductive foil strip 35 with one of the output connecting elements 39. Since the output connecting elements 39 are in contact with the error signal lamp 21, the error signal lamp 21 will now light up.

The symbols may be applied to the block 8 in a fixed manner, for example, by printing, or they may be removably attached. The latter can be accomplished by applying the symbols to an element, for example, by printing them on a piece of foil. The blocks 8 may then be provided with a pocket-type cover of transparent material which is attached to the upper surface of the blocks 8. The piece of foil then can be inserted into this pocket-type cover.

FIG. 16 shows a building block 8 with a pocket of transparent plastic sheet 50 adhesively bonded to wooden body 8a. Different pieces of foil 52 with symbols can be inserted into this pocket. The symbols are visible through the plastic sheet 50.

The manner of operation of the various embodiments set out herein is obvious from the foregoing description and the drawings. By varying the arrangement of the conductive elements on the circuit board, circuit card, and blocks, a high number of possible combination can be achieved.

It will be understood that the above description of the present invention is susceptible to various modifications, changes and adaptations.

I claim:
1. An educational game comprising, in combination:
(a) a plurality of interchangeable teaching element means positionable relative to one another and having top and bottom surfaces, the top surface being provided with symbols and the bottom surface being provided with at least one electrical conductive element;
(b) first signal means connected to indicate when said teaching element means are properly arranged relative to one another;
(c) second signal means connected to indicate when said teaching element means are improperly arranged relative to one another;
(d) circuit board means arranged for connecting said conductive elements to at least one of said signal means to provide an indication of whether the arrangement of said teaching element means is right or wrong;
(e) a voltage source connected to the circuit board means for delivering electric energy to the signal means;
(f) interchangeable circuit card means having two sides and electrically connected to the circuit board on one side and to the electrical conductive element on the other side; and
(g) interchangeable cover means for covering the circuit card means, the cover means having openings for inserting the teaching element means.

2. An educational game as defined in claim 1 wherein the teaching element means are building blocks.

3. An educational game as defined in claim 2 wherein the electrical conductive elements attached to the bottom surface of each of the building blocks is formed from a foil of conductive material.

4. An educational game as defined in claim 2 wherein the building blocks have rectangular configurations.

5. An educational game as defined in claim 2 wherein the building blocks have non-linear configurations.

6. An educational game as defined in claim 2 further including a pocket-like cover of transparent material attached to the upper surface of the building blocks, and in which pocket-like cover is a piece of foil to which the symbols are applied, the piece of foil being inserted into the pocket-like cover.

7. An educational game as defined in claim 1 wherein the circuit board means comprise a printed circuit.

8. An educational game as defined in claim 7 wherein the printed circuit board means includes magnetic means and the building blocks include elements of soft iron.

9. An educational game as defined in claim 8 wherein the elements of soft iron are attached to the bottom of the building blocks and are insulated from the conductive elements.

10. An educational game as defined in claim 7 wherein the printed circuit board means is of rectangular configuration and said first and second signal means include lamps; further including a frame and a box which contains a voltage source and a frame forming part of the box.

11. An educational game as defined in claim 10 wherein the signal lamps give off light of different colors, the lamp for the first signal means giving off a green color and the lamp for the second signal means giving off a red color.

12. An educational game as defined in claim 10 wherein the circuit board means includes a plurality of electrically insulated fields, a portion of these fields being connected to the voltage source, and portion of the fields being connected to the first signal means and a portion of the fields being connected to the second signal means.

13. An educational game as defined in claim 12 wherein the circuit board means is divided into four fields, one of which is connected with the voltage source, one of which is connected with the first signalling means and two of which are connected with the second signalling means.

14. An educational game as defined in claim 13 wherein the two fields which are connected to the second signalling means are so arranged that they extend substantially from two abutting sides of the frame inwardly into the center of the circuit board means, their having a comb like configuration, and the two other fields being arranged within the center portion of the circuit board means and being substantially symmetrical with respect to the center line of the frame.

15. An educational game as defined in claim 12 wherein the circuit card means includes a plurality of electrically insulated conductive foil elements which can contact the fields of the printed circuit board means and complete electrical circuits.

16. An educational game as defined in claim 15 wherein a portion of the conductive foil elements of the circuit card means are connected by the circuit board means with the voltage source and the first signalling means and the remaining conductive foil elements of the circuit card means fill the entire frame in a discontinuous meander pattern.

17. An educational game as defined in claim 16 wherein the building blocks have a rectangular configuration and are to be associated with the circuit card current means, the entire bottom surface of these blocks being conductive.

18. An educational game as defined in claim 12, further including insulating means to insulate the fields of the circuit board from each other.

19. An educational game as defined in claim 18 wherein the insulating means is four identical insulating plates which are insertable into the frame, the plates being shaped so that a building block of a non-linear configuration can fit into an opening formed by the four plates, the entire bottom surface of the building block being covered with a conductive foil.

20. An educational game as defined in claim 15 wherein the circuit current means is a band of substantially constant width, the band covering only a portion of the area of the frame.

21. An educational game as defined in claim 20 wherein the band includes an electrically discontinuous, conductive foil element connected with the voltage source and the first signal means, and at least one conductive foil element parallel and immediately adjacent to the discontinuous, conductive foil element, and at least one conductive foil element connected to said second signal means.

22. An educational game as defined in claim 20 further including an insulating foil having a symbol of the problem to be solved, said foil occupying that portion of the frame not occupied by the band.

23. An educational game as defined in claim 22 further including a transparent plate which covers the insulating foil bearing the problem to be solved.

24. An educational game as defined in claim 15 wherein the frame and circuit card means are each divided into one question field and one answer field, two conductive elements connected to the voltage source and three conductive elements connected to the second signal means, with at least a portion of each of these conduction elements arranged in the question field and three conductive elements connected to second signal means and two conductive elements connected to the first signal means with at least a portion of each of these elements arranged in the answer field, these portions of the conductive elements arranged in the question and answer fields being adjacent to the edge of the frame and wherein the remaining parts of the fields are connected to one another by parallel, longitudinally extending insulated conductive foil elements.

25. An educational game as defined in claim 24 wherein two building blocks with symbols are the teaching element means which provide the problem and the solution, either of said building blocks filling the question or answer fields of the circuit card means and whose conductive elements, when correctly associated, connect the first signal means conductive elements together; and, when incorrectly associated, connect one first signal means conductive elements with one second signal means conductive element.

26. An educational game as defined in claim 25 wherein the symbols and the conductive elements of the building blocks distinguish the "top" from the "bottom," respectively, and the blocks are asymmetrically constructed with reference to the axis of symmetry which is parallel to the parallel conductive foil elements.

27. An educational game as defined in claim 24 wherein there are nine parallel conductive foil elements.

28. An educational game as defined in claim 24 wherein the visible field of the circuit card means is constructed symmetrically with respect to the axis of symmetry which is perpendicular to the parallel conductive foil elements.

29. An educational game as defined in claim 15 wherein the frame and circuit card means are each divided into one question field and one answer field, one conductive element is connected to the volage source, one conductive element is connected to the first signal means and two conductive elements are connected to the second signal means with at least a portion of each of these conduction elements arranged in the answer field and wherein the question field and the answer field are connected together by a plurality of parallel, longitudinal extending conductive foil elements.

30. An educational game as defined in claim 29 wherein that portion of the conductive element connected to the first signal means that lies in the question field and that portion of the conductive element connected to the voltage source that lies in the answer field, are each opposite to the plurality of longitudinally extending conductive foil portions and opposite to each other.

31. An educational game as defined in claim 29 wherein there are six parallel conductive foil elements.

32. An educational game as defined in claim 29 wherein the associated building blocks are a question block and an answer block, the conduction strips on the question blocks connecting the conductive element portion arranged in the question field with only one of the plurality of longitudinally extending conductive foil elements, and the conductive strips on the answer blocks connecting the one longitudinally extending conductive foil element to one of said signal means to provide an indication of whether the arrangement of the answer block is right or wrong.

33. An educational game as defined in claim 1 further including a first relay means provided in the connecting means, the relay means being operable to deactivate the first signal means as soon as a voltage is applied to the switching relay.

34. An educational game as defined in claim 33 further including a second relay means having an armature, the second relay means connected to the second signal means and having two stable armature positions so that in one position the first signal means is activated and in the other position it is interrupted.

35. An educational game as defined in claim 34 wherein the second relay has two parallel-connected coils of which at least one can be short-circuited.

References Cited
UNITED STATES PATENTS

| | | | |
|---|---|---|---|
| 2,539,077 | 1/1951 | Hawkins | 35—9 |
| 2,853,799 | 9/1958 | Magnussen et al. | 35—9 |
| 2,997,793 | 8/1961 | Kelly | 35—9 |
| 3,015,895 | 1/1962 | Stall | 35—9 |
| 3,252,230 | 5/1966 | Donev | 35—9 |
| 3,380,176 | 4/1968 | Kling et al. | 35—9 |
| 3,137,079 | 6/1964 | Greuzard | 35—9 |

WILLIAM H. GRIEB, Primary Examiner